(12) United States Patent
Torii et al.

(10) Patent No.: US 7,137,167 B2
(45) Date of Patent: Nov. 21, 2006

(54) WIPER BLADE HAVING LEVER ASSEMBLY

(75) Inventors: Naoki Torii, Toyohashi (JP); Masaaki Kiyama, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 96 days.

(21) Appl. No.: 10/950,439

(22) Filed: Sep. 28, 2004

(65) Prior Publication Data

US 2005/0086759 A1  Apr. 28, 2005

(30) Foreign Application Priority Data

Oct. 23, 2003  (JP) .............................. 2003-363140

(51) Int. Cl.
*B60S 1/38* (2006.01)
(52) U.S. Cl. ................ 15/250.201; 15/250.44
(58) Field of Classification Search .......... 15/250.201, 15/250.44, 250.46, 250.361, 250.451, 250.48
See application file for complete search history.

(56) References Cited

U.S. PATENT DOCUMENTS 3,618,155 A * 11/1971 Mower .................. 15/250.201
3,899,800 A * 8/1975 Wittwer et al. .......... 15/250.44
4,741,071 A   5/1988 Bauer et al.
4,852,206 A * 8/1989 Fisher .................... 15/250.201

FOREIGN PATENT DOCUMENTS

| DE | 3532535   | * | 3/1987  |
| EP | 0343869   | * | 11/1989 |
| GB | 2140287   |   | 11/1984 |
| JP | A-6-234353|   | 8/1994  |

* cited by examiner

*Primary Examiner*—Gary K. Graham
(74) *Attorney, Agent, or Firm*—Posz Law Group, PLC

(57) ABSTRACT

A lever assembly is connected to a wiper arm and holds a wiper strip together with a backing plate, which is installed in the wiper strip. The lever assembly includes a plurality of levers. Each lever has a finned portion, in which a fin is integrally formed. The finned portion of each lever forms a mountain fold that has a top ridge. The top ridge of the lever is offset from the center line of the wiper strip on one side of the center line of the wiper strip in a transverse direction that is perpendicular to the center line of the wiper strip. The fin is formed in the finned portion of the lever on the other side of the center line of the wiper strip.

7 Claims, 6 Drawing Sheets

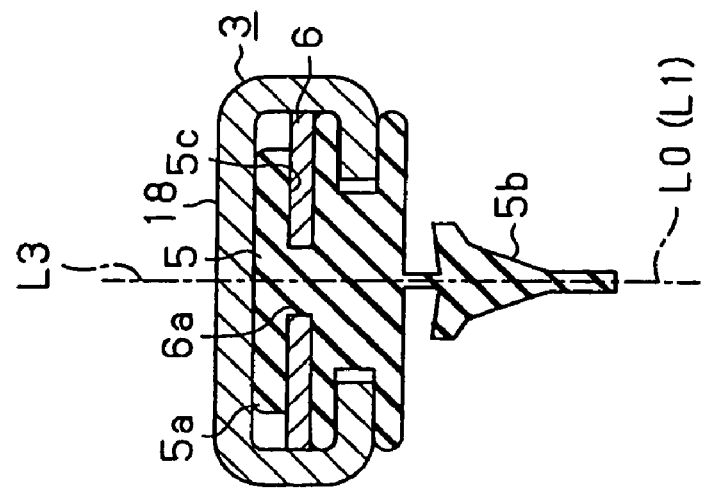
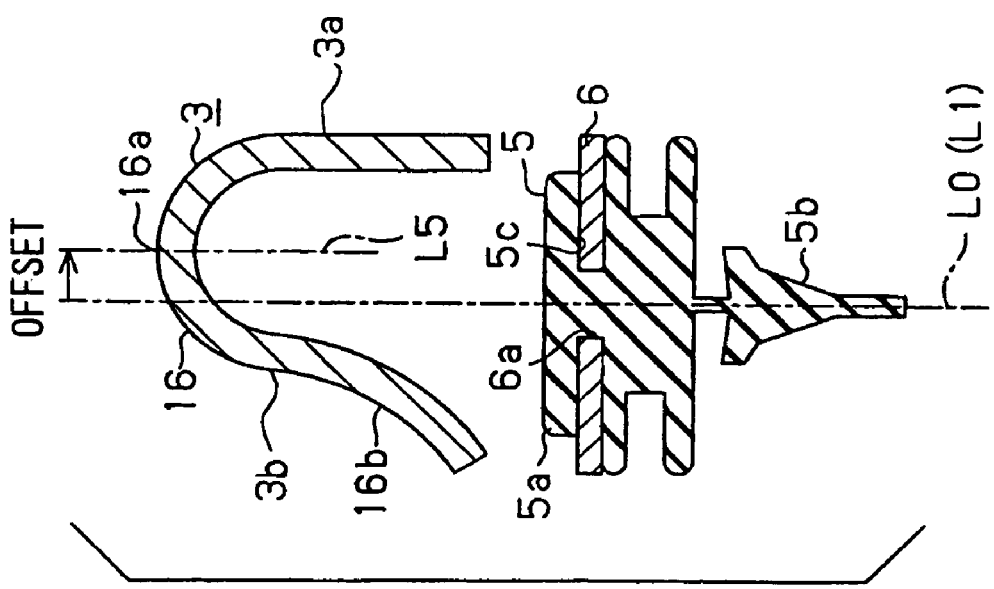

WIPER BLADE HAVING LEVER ASSEMBLY

CROSS REFERENCE TO RELATED APPLICATION

This application is based on and incorporates herein by reference Japanese Patent Application No. 2003-363140 filed on Oct. 23, 2003.

BACKGROUND OF THE INVENTION

1. Field of the Invention

The present invention relates to a wiper blade, which includes a fin that receives a head wind to limit lifting of the wiper blade from a surface of a glass at the time of driving a vehicle.

2. Description of Related Art

In general, a wiper blade, which wipes a front glass (windshield glass) of a vehicle, has a lever assembly. The lever assembly includes a plurality of levers that are linked together in tournament style. Furthermore, a wiper strip, to which a backing plate is installed, is installed to the lever assembly. Such a wiper blade could be lifted away from a surface (a wiping surface) of the front glass by a head wind, which is applied to the wiper blade from a front side of the traveling vehicle. To address the above disadvantage, Japanese Unexamined Patent Publication No. 6-234353 discloses a wiper blade, which includes a fin member (a blade spoiler). The fin member has a slant surface for generating a resistive urging force upon receiving the head wind applied to the wiper blade from the front side of the traveling vehicle. The resistive urging force, which is generated by the fin member, urges the wiper blade against the surface of the front glass to limit the lifting of the wiper blade from the surface of the front glass.

However, in the case of the wiper blade recited in Japanese Unexamined Patent Publication No. 6-234353, the fin member is provided separately from the lever assembly and thus needs to be installed to the lever assembly. This requires additional work for installing the fin member to the lever assembly.

Alternatively, a fin, which functions in a manner similar to that of the above fin member, may be formed integrally in each lever of the lever assembly. However, a size of such a fin needs to be increased to achieve a sufficient urging force for urging the entire wiper blade against the surface of the front glass by receiving the head wind at the time of driving the vehicle. Furthermore, when the size of the fin is simply increased, the fin significantly protrudes in a transverse direction of the wiper blade, causing obstruction of the field of view of the driver on his/her front side during the operation of the wiper at the time of driving the vehicle.

SUMMARY OF THE INVENTION

The present invention addresses the above disadvantages. Thus, it is an objective of the present invention to provide a wiper blade that includes a plurality of levers, each of which has a fin integrated therein in a manner that minimizes an increase in a size of the fin in a transverse direction of the wiper blade.

To address the objective of the present invention, there is provided a wiper blade, which includes a wiper strip, at least one backing plate and a lever assembly. The wiper strip directly wipes a wiping surface. The at least one backing plate is installed to the wiper strip and extends parallel to a center line of the wiper strip, which extends in a longitudinal direction of the wiper strip through a transverse center of the wiper strip. The lever assembly is connected to a wiper arm and holds the wiper strip together with the at least one backing plate, which is installed in the wiper strip. The lever assembly includes a plurality of levers, which are linked together in tournament style. Each lever has a finned portion, in which a fin is integrally formed. The finned portion of each lever forms a mountain fold that has a top ridge. The top ridge of the finned portion of each lever is offset from the center line of the wiper strip on a first side of the center line of the wiper strip in a transverse direction that is perpendicular to the center line of the wiper strip. The fin of each lever is formed in the finned portion of the lever on a second side of the center line of the wiper strip, which is opposite from the first side.

BRIEF DESCRIPTION OF THE DRAWINGS

The invention, together with additional objectives, features and advantages thereof, will be best understood from the following description, the appended claims and the accompanying drawings in which:

FIG. 6A is a cross sectional view along line VIA—VIA in FIG. 2B; and

FIG. 6B is a cross sectional view along line VIB—VIB in FIG. 2B.

DETAILED DESCRIPTION OF THE INVENTION

An embodiment of the present invention will be described with reference to the accompanying drawings.

Figure 1A:
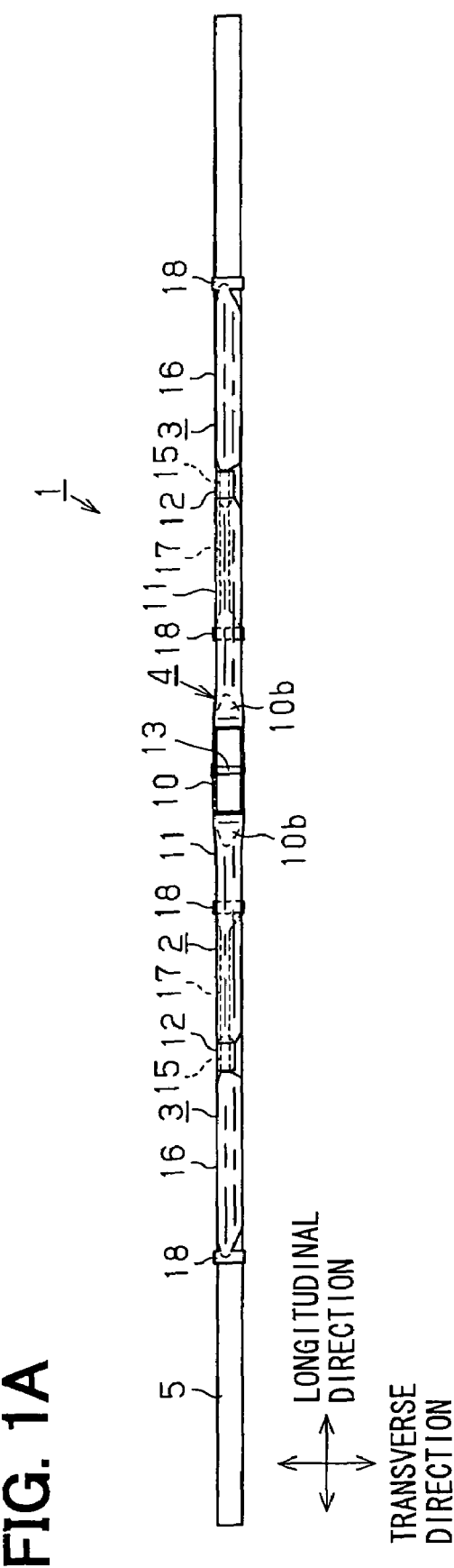
FIG. 1A is a plan view of a wiper blade according to an embodiment of the present invention.
Figure 1B:
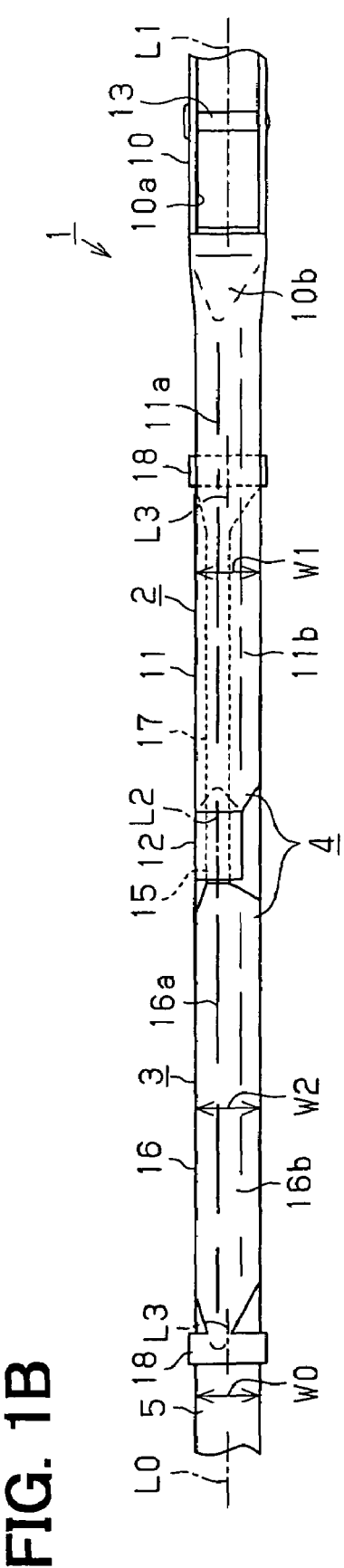
FIG. 1B is an enlarged partial plan view of the wiper blade of FIG. 1A.
Figure 2A:
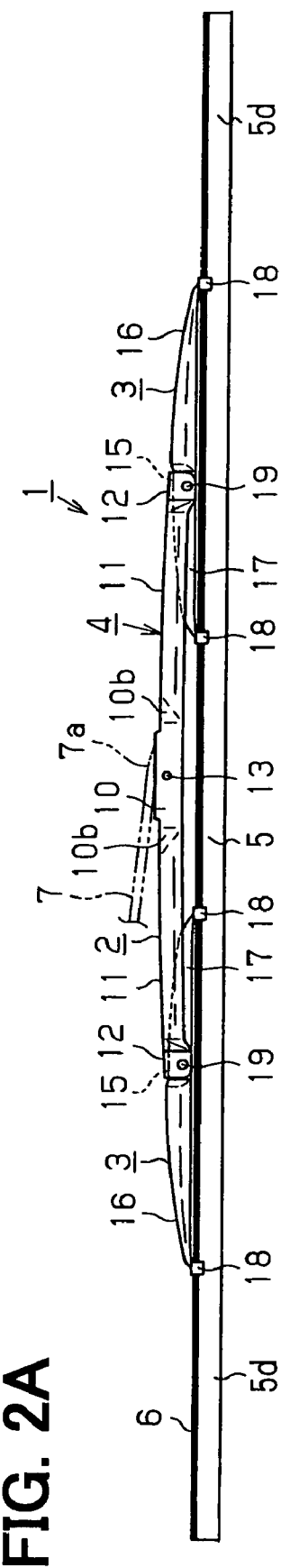
FIG. 2A is a front view of the wiper blade of FIG. 1A, which is placed such that a wiper strip of the wiper blade extends linearly.
Figure 2B:
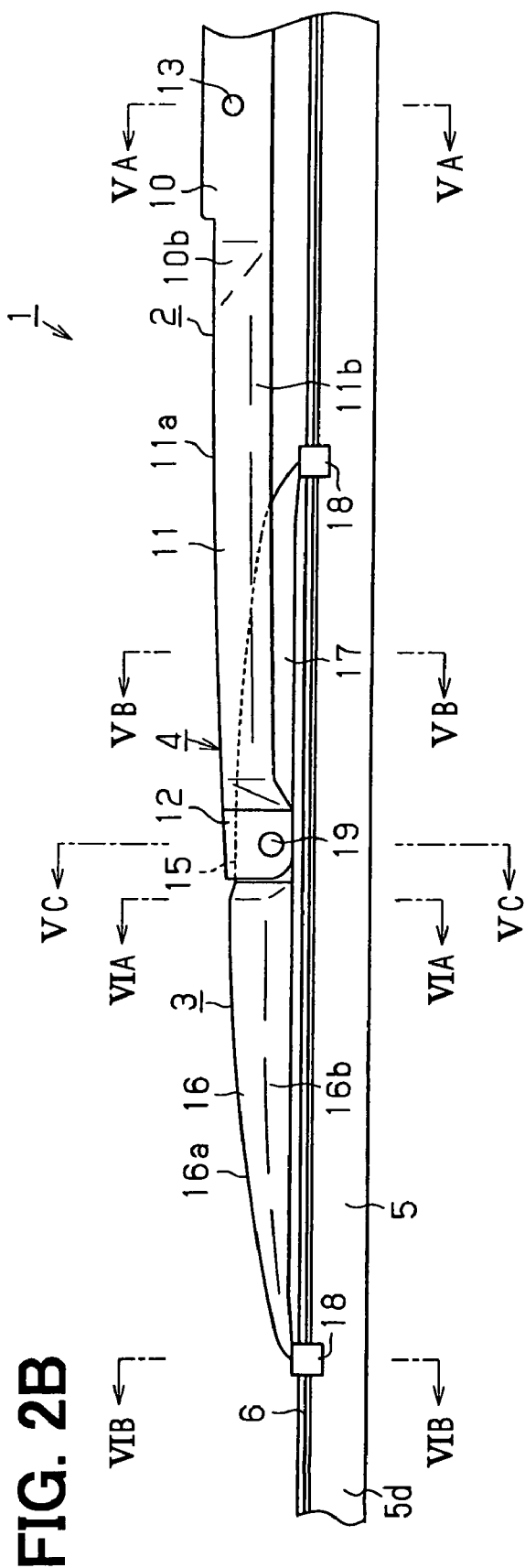
FIG. 2B is an enlarged partial front view of the wiper blade of FIG. 2A.
Figure 3:
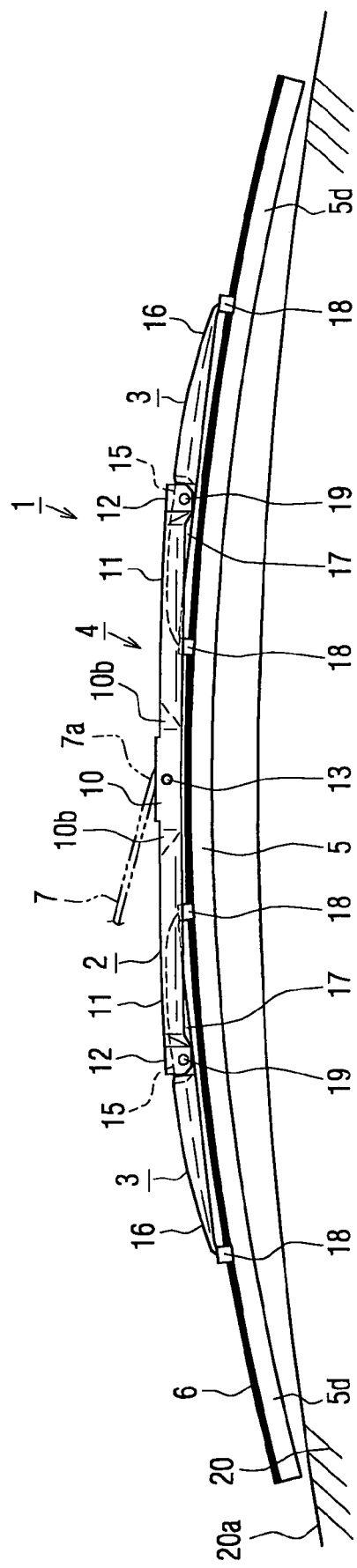
FIG. 3 is a schematic front view of the wiper blade, which is shown in FIGS. 1A to 2B and is in a relaxed state.
Figure 4:
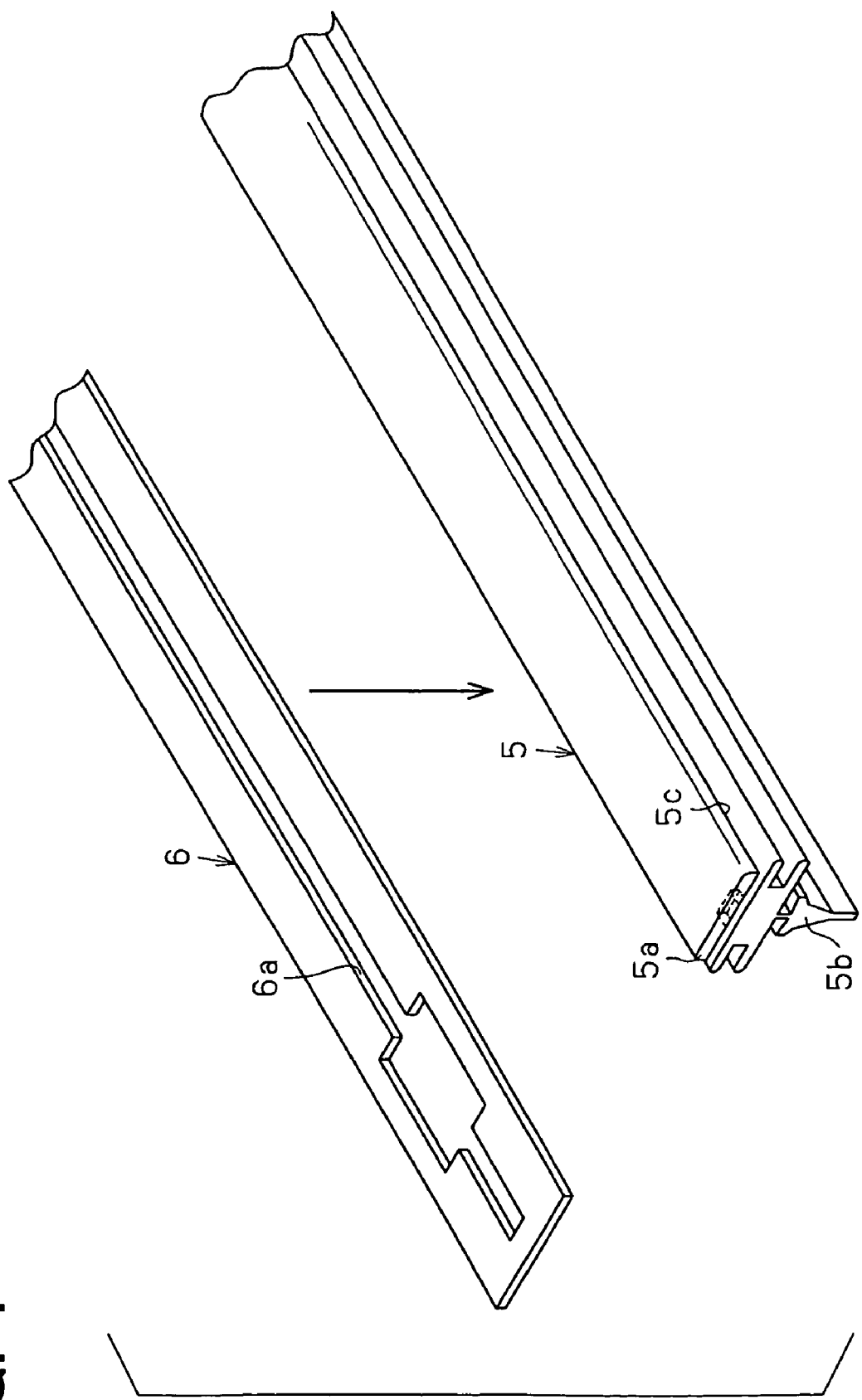
FIG. 4 is a perspective view showing disassembled state of a wiper strip and a backing plate of the wiper blade.

FIGS. 1 to 3 show a wiper blade 1 of the present embodiment, which wipes a front glass (windshield glass) 20 of a vehicle. It should be noted that FIG. 3 shows the front glass (windshield) 20 of the vehicle to be wiped by the wiper blade 1, and the wiper blade 1 is spaced away from the front glass 20 in FIG. 3 to indicate a difference between a curvature of a surface (wiping surface) 20a of the front glass 20 and a curvature of a wiper strip 5 of the wiper blade 1 in a relaxed state of the wiper strip 5 where the wiper strip 5 is removed away from the surface 20a of the front glass 20. Thus, it should be understood that in actual operation, unlike FIG. 3, the wiper blade 1 closely contacts the surface 20a of the front glass 20 to wipe the surface 20a of the front glass 20.

The wiper blade 1 is connected to a distal end 7a of a wiper arm 7. An urging force is applied from the wiper arm 7 to the wiper blade 1 toward the surface 20a of the front glass 20. The wiper arm 7 is swung by a wiper motor (not shown) within a predetermined angular range to wipe a predetermined angular range of the surface 20a of the front glass 20. The wiper blade 1 includes a lever assembly 4, the wiper strip 5 and a backing plate 6. The lever assembly 4 includes a primary lever 2 and two secondary levers 3. The primary lever 2 and the secondary levers 3 are linked together in tournament style. More specifically, in the tournament style, two ends of the primary lever 2 are respectively connected to the centers of the secondary levers 3.

In the lever assembly 4, the primary lever 2 is made from a metal plate material, which is processed to form a mountain fold through a press process, so that a lower side (a wiper strip 5 side) of the primary lever 2 has an elongated opening, which is elongated in the longitudinal direction. The primary lever 2 includes a first side wall 2a and a second side wall 2b, as shown in FIG. 5B. The primary lever 2 includes a connecting arrangement 10 (FIG. 5A), two arms 11 (FIG. 5B) and two connections 12 (FIG. 5C). The connecting arrangement 10 is arranged in a longitudinal center of the primary lever 2. The arms 11 extend from longitudinal ends, respectively, of the connecting arrangement 10 in opposite longitudinal directions. Each connection 12 is provided at a distal end (outer end) of a corresponding one of the arms 11.

Figure 5A:
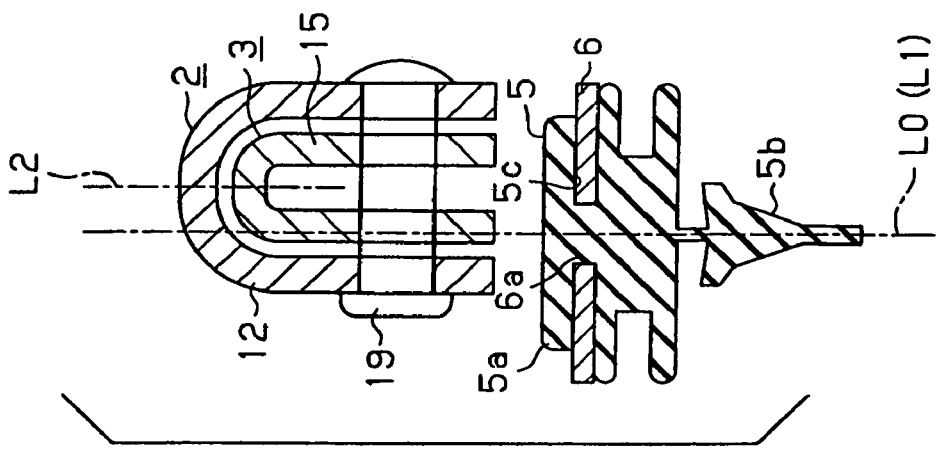
FIG. 5A is a cross sectional view along line VA—VA in FIG. 2B.
Figure 5B:
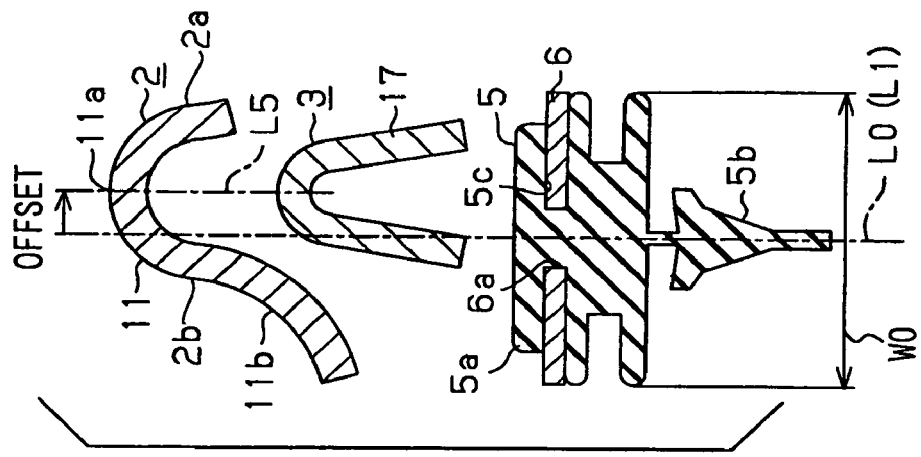
FIG. 5B is a cross sectional view along line VB—VB in FIG. 2B.
Figure 5C:
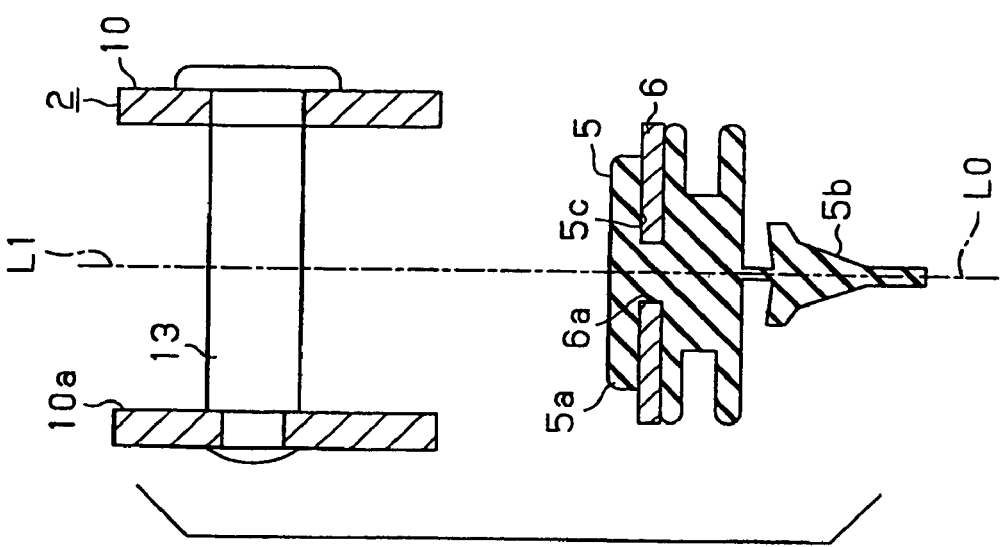
FIG. 5C is a cross sectional view along line VC—VC in FIG. 2B.

As shown in FIG. 5A, the connecting arrangement 10 has a rectangular opening 10a, which receives the distal end 7a of the wiper arm 7. Two lateral walls (left and right walls in FIG. 5A) of the connecting arrangement 10 extend parallel to one another. A transverse width of the connecting arrangement 10, which is measured in a transverse direction of the wiper strip 5 (FIG. 1A), is slightly larger than a transverse width of the wiper strip 5 installed to the lever assembly 4. A center line L1 of the connecting arrangement 10, which extends along a transverse center of the connecting arrangement 10, coincides with a center line L0 of the wiper strip 5, which extends along a transverse center of the wiper strip 5. A connecting pin 13, which rotatably connects the connecting arrangement 10 to the distal end 7a of the wiper arm 7, extends through both the lateral walls of the connecting arrangement 10 in the transverse direction.

As shown in FIG. 5B, each arm 11 is formed into a generally U-shaped body (i.e., a body having a U-shaped cross section), which has an opening on its lower side (wiper strip 5 side). The opening of the U-shaped body of the arm 11 is progressively widened in a downward direction (i.e., a direction toward the wiper strip 5 side). In the primary lever 2, a connecting arrangement 10 side end of each arm 11 is processed through a drawing process to form a drawn portion 10b, so that the above-described mountain fold of the primary lever 2 smoothly extends from the drawn portion 10b of the connecting arrangement 10. Each arm 11 has a top ridge (i.e., a top peak) 11a, which is offset a predetermined distance from the center line L1 of the connecting arrangement 10 (also the center line L0) on one side of the center line L1 (also on one side or a first side of the center line L0) in the transverse direction of the wiper strip 5. More specifically, the top ridge 11a extends linearly in a longitudinal direction of the primary lever 2 at a position, which is offset the predetermined distance from the center line L1 of the connecting arrangement 10 in the transverse direction of the wiper strip 5 on the downstream side (vehicle rear side) of the center line L1 with respect to a flow of a head wind applied to the traveling vehicle while the corresponding wiper arm 7 is held in its rest position.

Each arm 11 of the primary lever 2 has a fin 11b, which forms a finned portion of the lever 2. The fin 11b is formed integrally in the arm 11 to extend linearly in the longitudinal direction of the arm 11 and is located on the other side of the center line L1 (also on the other side or a second side of the center line L0) opposite from the top ridge 11a in the transverse direction of the wiper strip 5. The fin 11b is concavely curved from a front surface side to a rear surface side in such a manner that a transverse end of the fin 11b is obliquely and downwardly angled about 45 degrees. More specifically, when the fin 11b receives an air flow (head wind), which is applied to a lateral side (vehicle front side) of the wiper blade 1, the fin 11b exerts an urging force for urging the wiper blade 1 against the surface 20a of the front glass 20. A connection 12 side end of the arm 11 extends smoothly and continuously toward the connection 12. The arm 11, which includes the fin 11b, has a transverse width W1. The transverse width W1 of the arm 11 is measured in the transverse direction of the wiper strip 5 and is equal to a transverse width W0 of the wiper strip 5 (FIG. 1B).

As shown in FIG. 5C, the connection 12 is bent generally into a U-shaped body, which has an opening on its lower side (wiper strip 5 side). A transverse width of the connection 12, which is measured in the transverse direction of the wiper strip 5, is smaller than the transverse width of the wiper strip 5. A center line L2 of the connection 12, which extends along a transverse center of the connection 12, coincides with a straight line L5, along which the top ridge 11a of the arm 11 extends. More specifically, the center line L2 of the connection 12 is offset the predetermined distance from the center line L1 of the connecting arrangement 10 in the transverse direction of the wiper strip 5.

Each secondary lever 3 is made from a metal plate material, which is processed to form a mountain fold through a press process. Thus, a lower side (a wiper strip 5 side) of the secondary lever 3 has an elongated opening, which is elongated in the longitudinal direction. Each secondary lever 3 includes a first lateral wall 3a and a second lateral wall 3b, as shown in FIG. 6A. Each secondary lever 3 includes a connection 15 (FIG. 5C), an outer arm 16 (FIG. 6A), an inner arm 17 and two holding claws (holding portions) 18 (FIG. 6B). The connection 15 is located in the longitudinal center of the secondary lever 3. The outer arm 16 extends outwardly from the connection 15 in the longitudinal direction. The inner arm 17 extends inwardly from the connection 15 toward the longitudinal center of the wiper strip 5 in the longitudinal direction. The holding claws 18 are provided on opposed ends of the secondary lever 3 (i.e., an end of the outer arm 16 and an end of the inner arm 17).

As shown in FIG. 5C, the connection 15 is bent generally into a U-shaped body, which has an opening at its lower side (i.e., a wiper strip 5 side). A transverse width of the connection 15, which is measured in the transverse direction of the wiper strip 5, is smaller than the transverse width of the corresponding connection 12 of the primary lever 2. Thus, the connection 15 is receivable into the connection 12 from the lower side of the connection 12. The connection 15 is rotatably connected to the connection 12 by a connecting pin 19 while the connection 15 is received in the connection 12. More specifically, each secondary lever 3 is rotatably connected to the corresponding connection 12 of the primary lever 2. A center line of the connection 15, which extends along a transverse center of the connection 15, coincides with the center line L2 of the connection 12.

As shown in FIG. 6A, the outer arm 16 is bent generally into a U-shaped body, which has an opening on its lower side (wiper strip 5 side). The opening of the U-shaped body of the outer arm 16 is progressively widened in a downward direction (i.e., a direction toward the wiper strip 5 side). A connection 15 side end of the outer arm 16 extends continuously and smoothly from the connection 15. Similar to the arm 11 of the primary lever 2, the outer arm 16 includes a top ridge (i.e., a top peak) 16a, which is offset a predetermined distance from the center line L1 of the connecting arrangement 10 of the primary lever 2 (also the center line L0) on one side of the center line L1 (also on the one side or the first side of the center line L0) in the transverse direction of the wiper strip 5. The top ridge 16a extends continuously and linearly in the longitudinal direction of the secondary lever 3. The top ridge 16a of the outer arm 16 extends along the line L5, along which the top ridge 11a of the arm 11 of the primary lever 2 extends.

Furthermore, similar to the arms 11 of the primary lever 2, the outer arm 16 of each secondary lever 3 includes a fin 16b, which forms a finned portion of the secondary lever 3. The fin 16b is integrally formed in the outer arm 16 to extend continuously in the longitudinal direction and which is located on the other side of the center line L1 (also on the other side or the second side of the center line L0) opposite from the top ridge 16a in the transverse direction of the wiper strip 5. The fin 16b is concavely curved from a front surface side to a rear surface side in such a manner that a transverse end of the fin 16b is obliquely and downwardly angled about 45 degrees. The fin 16b receives the head wind, which is applied to the lateral side (vehicle front side) of the wiper blade 1, i.e., which is applied to the lateral side of the wiper blade 1 on an upstream side of the wiper blade 1 with respect to the head wind that is applied to the traveling vehicle while the corresponding wiper arm 7 is held in its rest position. When the fin 16b receives such a head wind, the fin 16b exerts an urging force for urging the wiper blade 1 against the surface 20a of the front glass 20. A holding claw 18 side end of the outer arm 16 extends continuously and smoothly toward the holding claw 18. Similar to the arm 11 of the primary lever 2, the outer arm 16, which includes the fin 16b, has a transverse width W2. The transverse width W2 of the fin 16b is the same as the transverse width W0 of the wiper strip 5 (FIG. 1B).

As shown in FIG. 6B, the distal end of the outer arm 16 of each secondary lever 3, i.e., the holding claw 18, which is provided at the outer end of the secondary lever 3, is bent generally into a C-shaped body, which has an opening on its lower side (wiper strip 5 side). A transverse width of the holding claw 18, which is measured in the transverse direction of the wiper strip 5, is slightly larger than the transverse width of the wiper strip 5. Furthermore, a center line L3 of the holding claw 18, which extends along a transverse center of the holding claw 18, coincides with the center line L1 of the connecting arrangement 10 of the primary lever 2, which extends along the transverse center of the connecting arrangement 10. A base 5a of the wiper strip 5, to which the backing plate 6 is installed, is inserted into the holding claw 18 in the longitudinal direction of the wiper strip 5 and is held by the holding claw 18.

The inner arm 17 of each secondary lever 3 is bent generally into a U-shaped body, which has an opening on its lower side (wiper strip 5 side). A transverse width of the inner arm 17, which is measured in the transverse direction of the wiper strip 5, is smaller than the transverse width of the wiper strip 5. An upper side of the inner arm 17 is constructed to be received in the corresponding arm 11 of the primary lever 2. A center line of the inner arm 17, which extends along a transverse center of the inner arm 17, coincides with the center line L2 of the connection 15, which extends along the transverse center of the connection 15 and which coincides with the line L5.

The distal end of the inner arm 17, i.e., the holding claw 18, which is provided at the inner end of the secondary lever 3, is bent generally into a C-shaped body, which has an opening on its lower side (wiper blade 5 side). A transverse width of the holding claw 18, which is measured in the transverse direction of the wiper strip 5, is slightly larger than the transverse width of the wiper strip 5. Furthermore, a center line L3 of the holding claw 18, which extends along a transverse center of the holding claw 18, coincides with the center line L1 of the connecting arrangement 10 of the primary lever 2, which extends along the transverse center of the connecting arrangement 10. The base 5a of the wiper strip 5, to which the backing plate 6 is installed, is inserted into the holding claw 18 in the longitudinal direction of the wiper strip 5 and is held by the holding claw 18.

The wiper strip 5 is made of a resilient material, such as a rubber material. As shown in FIGS. 4 to 6B, the wiper strip 5 includes the base 5a and a wiping lip 5b. The base 5a is held by each holding claw 18 of the lever assembly 4, and the wiping lip 5b extends from the base 5a and contacts the surface 20a of the front glass 20 at its distal end to wipe, for example, rain drops on the surface 20a. The base 5a and the wiping lip 5b are formed continuously in the longitudinal direction of the wiper strip 5. Furthermore, a backing plate receiving groove 5c, which receives the backing plate 6, extends continuously along the base 5a on both lateral sides of the base 5a to receive the backing plate 6a. It should be noted that some geometrical lines on the lateral sides of the wiper strip 5 are eliminated for the sake of clarity in FIGS. 1A and 1B.

The backing plate 6 is made of a metal plate, which has spring characteristics. Furthermore, the backing plate 6 includes a receiving hole 6a, which penetrates through the backing plate 6. The receiving hole 6a receives the base 5a of the wiper strip 5 and extends continuously in a longitudinal direction of the backing plate 6 to have a predetermined length, which is slightly smaller than the length of the backing plate 6. When the base 5a of the wiper strip 5 is inserted into the receiving hole 6a of the backing plate 6 in such a manner that the backing plate 6 is received in the backing plate receiving groove 5c of the base 5a, the backing plate 6 is installed to the base 5a of the wiper strip 5. The backing plate 6 disperses the urging force of the lever assembly 4, which urges the wiper strip 5 against the surface 20a of the front glass 20, along the length of the wiper strip 5.

The backing plate 6 is installed to the backing plate receiving groove 5c of the base 5a of the wiper strip 5. The base 5a of the wiper strip 5, to which the backing plate 6 is installed, is held by the holding claws 18 of the lever assembly 4 (the secondary levers 3) at the predetermined intervals to form the wiper blade 1 of the present embodiment.

The backing plate 6 is convexly curved in the relaxed state of FIG. 3 in such a manner that a longitudinal center of the backing plate 6 projects in a direction away from the surface 20a of the front glass 20. Thus, in the relaxed state, the wiper strip 5, to which the backing plate 6 is installed, is curved, as shown in FIG. 3. Furthermore, in the relaxed state of the wiper strip 5, a radius of curvature of the wiper strip 5 (and thus of the backing plate 6) is smaller than a radius of curvature of the surface 20a of the front glass 20.

Furthermore, an end one (the right end one in FIG. 3) of the holding claws 18 is immovably connected to the wiper strip 5 by a known means while the other holding claws 18 other than the end one are slidable relative to the wiper strip 5. With this structure, the wiper strip 5 can flex and longitudinally slide relative to the end one of the holding claws 18 of the lever assembly 4 at the time of wiping the surface 20a of the front glass 20 to conform to the surface 20a (i.e., the curvature of the surface 20a). Furthermore, the wiper strip 5, to which the backing plate 6 is installed, has first and second end follower sections 5d, which substantially freely and elastically conform to the surface 20a of the front glass 20 when the wiper strip 5 is swung along the surface 20a. The first end follower section 5d has a predetermined length and is located between a first longitudinal end (the left end in FIG. 2A or 3) of the wiper strip 5 and a closest one of the holding claws 18, which is closest to the first longitudinal end of the wiper strip 5. The second end follower section 5d has a predetermined length and is located between a second longitudinal end (the right end in FIG. 2A or 3) of the wiper strip 5 and a closest one of the holding claws 18, which is closest to the second longitudinal end of the wiper strip 5. The first and second end follower sections 5d of the wiper strip 5 can be easily flexed by the urging force of the backing plate 6 to appropriately conform to the curvature of the surface 20a of the front glass 20. Therefore, it is possible to achieve good wiping performance.

It should be noted that although the single backing plate 6 is provided in the present embodiment, the number of backing plates is not limited to one. For example, in place of the single backing plate 6, two separate backing plates may be provided on the vehicle front side and the vehicle rear side of the base 5a of the wiper strip 5 and may be respectively received in the laterally extending parts of the backing plate groove 50 provided in the lateral sides, respectively, of the base 5a.

Next, advantages of the present embodiment will be described.

(1) Each of the arms 11 of the primary lever 2 and the arm 16 of each secondary lever 3 forms the corresponding mountain fold, which has the top ridge 11a, 16a that is offset from the center line L0 of the wiper strip 4 in the transverse direction of the wiper strip 5 on the one side of the center line L0. Furthermore, the fin 11b, 16b is formed in each of the arms 11 of the primary lever 2 and the arm 16 of each secondary lever 3 on the other side of the center line L0 opposite from the top ridge 11a, 16a in the transverse direction of the wiper strip 5. Thus, the fin 11b, 16b can extend from the top ridge 11a, 16a of the lever 2, 3. Since the top ridge 11a, 16a is offset from the center line L0 of the wiper strip 5 on the downstream side (the vehicle rear side) of the center line L0 with respect to the head wind applied to the traveling vehicle, the size of each fin 11b, 16b can be advantageously increased while limiting an increase in the size of the protrusion of the fin 11b, 16b in the transverse direction of the wiper strip 5. As a result, it is possible to maintain the good view of the driver on his/her front side.

(2) The arms 11, 16 of the primary and secondary levers 2, 3, to each of which the corresponding fin 11b, 16b is formed, has the corresponding transverse width, which is the same as that of the wiper strip 5. Thus, in the present embodiment, each fin 11b, 16b does not protrude from the wiper strip 5 in the transverse direction of the wiper strip 5.

(3) Although the top ridges 11a of the primary lever 2 and the top ridge 16a of each secondary lever 3 are offset from the center line L0 of the wiper strip 5, the center line L1 of the connecting arrangement 10 and the center line L3 of each holding claw 18 are located along the center line L0 of the wiper strip 5. In the wiper blade 1, the urging force for urging the wiper blade 1 against the surface 20a of the front glass 20 is applied from the wiper arm 7. However, since the center line L1 of the connecting arrangement 10 and the center line L3 of each holding claw 18 are located along the center line L0 of the wiper strip 5, it is possible to limit generation of a torsional force between the connecting arrangement 10 and each holding claw 18 upon application of the urging force from the wiper arm 7 to the wiper blade 1. Thus, the urging force can be effectively transmitted from the wiper arm 7 to the wiper strip 5.

(4) The top ridges 11a, 16a of the primary and secondary levers 2, 3 extend continuously and linearly in the longitudinal direction of the wiper strip 5. Thus, the fins 11b, 16b can be made similarly in the longitudinal direction.

(5) The primary lever 2, which is connected to the wiper arm 7, has the drawn portions 10b in the ends of the connecting arrangement 10, which is connected to the wiper arm 7. Furthermore, the drawn portions 10b are made by drawing the metal plate material, which is used to form the primary lever 2. The drawn portions 10b provide the high rigidity to the ends of the connecting arrangement 10. Thus, even though the primary lever 2 is made as the relatively slim lever, the urging force, which is applied from the wiper arm 7, can be spread along the primary lever 2.

The above embodiment can be modified as follows.

In the above embodiment, the transverse width of each of the arms 11, 16, in which the fins 11b, 16b of the primary and secondary levers 2, 3 are formed, is set to be the same as the transverse width of the wiper strip 5. However, the transverse width of each of the arms 11, 16 can be slightly increased or decreased relative to the transverse width of the wiper strip 5.

In the above embodiment, the surface of each of the fins 11b, 16b is curved. Alternatively, the surface of each of the fins 11b, 16b can be flat.

In the above embodiment, each of the top ridges 11a, 16a of the arms 11, 16 is curved. Alternatively, each of the top ridges 11a, 16a of the arms 11, 16 can be shaped to form an obtuse angle or an acute angle.

In the above embodiment, the lever assembly 4 includes the single primary lever 2 and the two secondary levers 3. However, the number of levers in the lever assembly 4 is not limited to this and can be modified in any appropriate manner.

In the above embodiment, each of the primary and secondary levers 2, 3 is made through the press process of the corresponding metal plate material and the drawing process of the portions of the metal plate material. However, the present invention is not limited to this. For example, each of the primary and secondary levers 2, 3 can be entirely made through the drawing process or any other appropriate process.

Additional advantages and modifications will readily occur to those skilled in the art. The invention in its broader terms is therefore not limited to the specific details, representative apparatus, and illustrative examples shown and described.

What is claimed is:

1. A wiper blade comprising:
   a wiper strip that directly wipes a wiping surface;
   at least one backing plate that is installed to the wiper strip and extends parallel to a center line of the wiper strip, which extends in a longitudinal direction of the wiper strip through a transverse center of the wiper strip; and a lever assembly that is connected to a wiper arm and holds the wiper strip together with the at least one backing plate, which is installed in the wiper strip, wherein:

the lever assembly includes a plurality of levers, which are linked together in tournament style;

each lever has a finned portion, in which a fin is integrally formed;

the finned portion of each lever forms a continuous mountain fold that has a first lateral wall, a top ridge and a second lateral wall, which are formed integrally and continuously along an entire length of the mountain fold;

the first and second lateral walls of the mountain fold are arranged on first and second sides, respectively, of the top ridge in a transverse direction that is perpendicular to the center line of the wiper strip;

the top ridge of the finned portion of each lever is offset from the center line of the wiper strip in the transverse direction such that the top ridge is located on a first side of the center line of the wiper strip; and the fin of each lever is formed in the second lateral wall of the mountain fold, such that the fin of each lever is located on a side of the top ridge that is opposite to the direction of the offset.

2. The wiper blade according to claim 1, wherein the lever assembly has a transverse width, which is generally the same as a transverse width of the wiper strip.

3. The wiper blade according to claim 1, wherein:

one of the plurality of levers includes a connecting arrangement and is connected to the wiper arm through the connecting arrangement;

a center line of the connecting arrangement, which extends through a transverse center of the connecting arrangement, coincides with the center line of the wiper strip;

at least one of the rest of the plurality of levers other than the one of the plurality of levers includes at least one holding claw to hold the wiper strip; and a center line of each holding claw, which extends through a transverse center of the holding claw, coincides with the center line of the wiper strip.

4. The wiper blade according to claim 1, wherein the top ridge of the finned portion of each lever extends generally parallel to the center line of the wiper strip.

5. The wiper blade according to claim 1, wherein:

one of the plurality of levers includes a connecting arrangement and is connected to the wiper arm through the connecting arrangement; and each of opposed longitudinal ends of the connecting arrangement includes a drawn portion, which is formed by drawing a metal plate material of the one of the plurality of levers.

6. The wiper blade according to claim 1, wherein:

each of the at least one backing plate is made of a spring material and is convexly curved in a relaxed state in such a manner that a longitudinal center of the backing plate projects in a direction away from the wiping surface;

the wiper strip includes at least one backing plate groove, which extends in the longitudinal direction of the wiper strip and receives the at least one backing plate;

the lever assembly includes a plurality of holding portions, which hold at least one of the wiper strip and the at least one backing plate in a manner that permits sliding movement of the wiper strip and the at least one backing plate relative to the lever assembly in the longitudinal direction of the wiper strip;

the wiper strip, to which the at least one backing plate is installed, has first and second end follower sections, which substantially freely and elastically conform to the wiping surface;

the first end follower section has a predetermined length and is located between a first longitudinal end of the wiper strip and a closest one of the plurality of holding portions, which is closest to the first longitudinal end of the wiper strip; and the second end follower section has a predetermined length and is located between a second longitudinal end of the wiper strip and a closest one of the plurality of holding portions, which is closest to the second longitudinal end of the wiper strip.

7. The wiper blade according to claim 1, wherein the second lateral wall of the mountain fold includes:

a first wall portion that is located between the top ridge of the mountain fold and the center line of the wiper strip; and a second wall portion that is located on a second side of the center line of the wiper strip, which is opposite to the first side of the center line.

* * * * *